Patented Feb. 21, 1928.

1,659,723

UNITED STATES PATENT OFFICE.

ARTHUR S. COSLER, OF CHICAGO, ILLINOIS, ASSIGNOR OF ONE-HALF TO TURNEY PROCESSES, INC., OF WASHINGTON, DISTRICT OF COLUMBIA, A CORPORATION OF DELAWARE.

METHOD OF PREPARING A POWDERED MILK FOR ICE-CREAM MIX.

No Drawing.   Application filed April 25, 1927.   Serial No. 186,597.

The invention is primarily a development or improvement on what is known as the "Turney process" as set forth in patents granted to Paul W. Turney, August 1, 1922, Nos. 1,424,602 and 1,424,603, particularly the latter patent, and relates broadly to ice cream manufacture, and more particularly to a process for producing a powdered milk product to be used as an element in the manufacture or preparation of ice cream or ice cream mix.

Turney Patent No. 1,424,603, describes the manufacture of a binder, filler or stabilizer, consisting of a specially treated milk product, which can be used in ice cream manufacture in place of the artificial binders or fillers, other than milk products, previously used. In this filler, the casein particles have been increased in size and rendered jelly-like, by the introduction into milk, preferably skim milk which has been previously partially evaporated, of a small quantity of alkali, with sufficient agitation of the mixture following the introduction of the alkali to incorporate the alkali into the casein particles, thereby causing them to swell and develop a gelatinous character.

The filler or binder produced according to the above process is very satisfactory when used in the liquid condition and possesses marked stabilizing properties. In commercial practice, however, it is frequently desirable to produce the filler in the form of a powder which may be kept for a considerable time without becoming rancid, and which, when reconstituted into milk to be used in an ice cream mix, will have binder or stabilizer properties equal to those possessed by the milk solids, not subsequently powdered, which have been prepared by the Turney process.

It has been found, however, by experiment, that the filler produced by the Turney process, when powdered, loses some of its binder or stabilizing properties, and it is the principal object of the present invention to improve the Turney process so that a maximum of the stabilizer effect is maintained, even when the filler is reduced to powdered form.

I have found that by superheating and thickening the milk, from which the filler is produced just prior to the alkali treatment of the Turney process, a permanency is imparted to the stabilizer or binder effect, which permits the filler to be reduced to a powder, and when reconstituted into milk to be used in the ice cream mix, its binder or stabilizing properties are bound to be substantially unimpaired.

It is not to be understood that I claim this superheating and thickening, broadly, as my invention, as the thickening effect imparted by such superheating has been known and practiced in the condensing industry for a period of many years. I do, however, claim this superheating or thickening effect as a step or integral part in the preparation of a stabilized powdered filler for use in ice cream mix.

The powdered filler, produced by the process, is found to possess excellent binder properties, and when used in ice cream making, renders unnecessary the use of any extraneous substance, such as gelatine, gum, glue, starch, egg yolk or other substances generally employed to impart such properties as smoothness and "standing up" quality to ice cream.

For a full understanding of my invention, a preferred embodiment thereof will now be described in detail, although it will be understood that the invention is not to be limited to such details.

In carrying out the process either skim or whole milk may be employed for the production of the powdered milk containing a self constituted filler or binder, but it is found that the keeping qualities of powder from skim milk are better than a similar powder from whole milk, and accordingly I prefer to employ skim milk. This may be preferably concentrated or condensed in a suitable vacuum pan to the usual density, approximately three to one, or containing twenty-six to twenty-eight percent serum solids.

The milk is now treated by heating it above the coagulating point of lactalbumin but without scorching, the temperature range being from approximately 175° to 212° F., depending on the character of the milk and other considerations. This step I refer to as superheating, and may be carried out on normal milk containing 8–9% of serum solids, though I prefer to employ milk from which a large part of the water has been removed.

The superheating has the effect of thickening the milk appreciably. It is believed that the explanation for this action is that the lactalbumin, being intimately incorporated in the whole mass of milk, does not separate out as separate flocks, but coagulates in such a way that it enmeshes some of the casein particles that exist in a state bordering on colloidal, some casein being perhaps colloidal. The lactalbumin and casein particles existing thus in this state of intimate association tend to give more "body" to the mass, and the above noted thickening results.

Whatever the true explanation for the theory of such thickening or superheating may be, the fact remains that by the employment of this step in connection with the Turney process, the final powdered product possesses permanent binder or stabilizer properties, which it does not have where this step is omitted.

This thickening cannot be carried out to the same degree in all milk, nor can the heating be carried as high in some milk without throwing out or curdling the casein. The presence of acid, bacteria, and enzymes determine the degree of heating, and where these are present the process must be carried out at lower temperatures and the heating prolonged. Usually it may be said that the duration of treatment for condensed milk will be from fifteen to thirty minutes, depending on the temperature it is judged best to use.

After superheating to thicken the milk, it is preferably allowed to cool to ordinary temperatures before the next stage of the process is undertaken, but this is not absolutely essential.

A suitable alkali is now incorporated into the heat thickened-mass accompanied by rapid agitation. The agitating devices should be especially arranged to give a good circulation of the mass, so that the alkali will be thoroughly and uniformly distributed. There should also be a good beating or mixing agitation so that any clots of thick jell may be broken up and a smooth mass will result.

The alkali used is preferably calcium hydrate. Where the calcium hydrate is used it may be added in the form of a cream made from pure calcium oxide and water. If preferred a quantity of sugar may be added to the calcium hydrate to form calcium sucrate.

It should be noted that the calcium oxide may be replaced by other alkalies, in whole or in part. The specific effect sought for on the final product is not, however, due to simple neutralization. While other alkalies will neutralize as well or better than lime, and give the gelatinizing effect, they do not produce the same binder or stabilizing effect in the final ice cream product, that is obtained where lime is used in the preparation of the filler.

This difference is due to certain qualities inherent in the nature of milk solids and their reactions. When milk sugar ferments to lactic acid, the acid produced partly combines with a portion of the calcium, normally united with the casein in the milk. As this reaction progresses, the casein being less soluble precipitates until finally the "clabbering effect" of sour milk is produced. When sweet milk such as is used in the present process, is employed the acidity is never over a few hundredths of a per cent lactic acid. When calcium hydrate or sucrate is added, part combines with the acid, and part with casein, making the latter more soluble, the particles probably taking up water and becoming jelly-like.

While this action of the lime on casein can thus only be brought about by practically neutralizing the lactic acid in the milk, it is definitely due to a cause separate from the neutralization itself. It is the properties of the calcium caseinate formed at this stage by adding the alkali (calcium oxide) equivalent to $1/_8$ to $1/_{20}$ ounces per gallon of normal sweet milk, to the thickened milk product which appears to be responsible for the stabilized qualities of the final powder. The proportions of the alkali may be varied slightly from those above set forth, but should be maintained approximately.

Following the thickening and alkali treatments, the milk may be reduced to a powder or flakes in any suitable manner, being preferably forced under high pressure through spray nozzles, and dried in the customary air drying systems.

The powder so produced may be kept for long periods, without deterioration. When used in making ice cream the powder may be reconstituted into milk by dissolving directly in water, preferably with agitation, and the reconstituted milk will be found to possess all the thickening properties desirable in a first class binder, which may be used as an element in the ice cream mix without the addition of gelatine, or other substances foreign to the natural ingredients of ice cream mix. The ice cream produced thereby possesses in marked degree desirable qualities such as smoothness, body, and fine flavor.

Having thus described my invention, what I claim as new and desire to secure by Letters Patent is:—

1. A method of preparing a powdered milk for ice cream mix or the like, which when reconstituted will have marked stabilizing or binder properties, which process consists in thickening milk by heating at a temperature above the coagulating point of lactalbumin but without scorching, adding thereto an alkaline solution, agitating the mixture, then reducing the same to powder.

2. A method of making a powdered milk for ice cream mix or the like, which when reconstituted, will have marked binder or stabilizing properties, which process consists in heating milk to a temperature above the coagulating point of lactalbumin but without scorching, until a substantial thickening occurs, introducing thereinto a solution of calcium oxide with sugar, agitating the mixture, then reducing the same to powder.

3. A method of making a powdered milk for ice cream mix or the like, which, when reconstituted, will have marked stabilizing or binder properties, which method consists in thickening skim milk by heating to a temperature of from 175 to 212° F., adding thereto an alkali solution, agitating until a gelatine-like mass is produced, then drying and reducing the same to powder.

4. The method of making a powdered milk for ice cream mix or the like, which when reconstituted will have marked stabilizing or binder properties, which process consists in reducing the fluidity of the milk, superheating the same at a temperature above the coagulating point of lactalbumin but without scorching, adding thereto a proportion of alkali of such relatively small quantity as to be substantially imperceptible in the final product, agitating the mixture, then reducing same to powder.

5. A method of making powdered milk for ice cream mix or the like, which when reconstituted, will have marked stabilizing or binder properties, which process consists in heating milk to a temperature above the coagulating point of lactalbumin but without scorching, until a substantial thickening occurs, introducing thereinto a solution of calcium oxide, agitating the mixture, then reducing the same to powder.

In testimony whereof I affix my signature.

ARTHUR S. COSLER.